United States Patent [19]
Pirchl

[11] Patent Number: 5,844,177
[45] Date of Patent: Dec. 1, 1998

[54] HEAT SHIELD WITH FASTENING FOR EXHAUST SYSTEMS

[75] Inventor: Gerhard Pirchl, Birrwil, Switzerland

[73] Assignee: Hecralmat, Schaan, Liechtenstein

[21] Appl. No.: 737,388

[22] PCT Filed: Mar. 8, 1996

[86] PCT No.: PCT/EP96/00984

§ 371 Date: Jan. 13, 1997

§ 102(e) Date: Jan. 13, 1997

[87] PCT Pub. No.: WO96/28315

PCT Pub. Date: Sep. 19, 1996

[51] Int. Cl.[6] .............................. F01N 7/00; B60K 13/04
[52] U.S. Cl. ........................................ 181/211; 180/89.2
[58] Field of Search .................................. 181/211, 243, 181/282; 60/321, 323; 123/195 C, 198 E; 248/62; 180/89.2

[56] References Cited

U.S. PATENT DOCUMENTS 3,237,716  3/1966  Parsons .
4,085,816  4/1978  Amagai et al. ............................ 248/62
4,609,067  9/1986  Gonwa ..................................... 181/211
4,612,767  9/1986  Engquist et al. ......................... 60/321
5,211,013  5/1993  Bonde et al. ............................ 60/323
5,603,297  2/1997  Wolf et al. ........................... 123/195 C
5,680,757  10/1997  Pirchl ..................................... 181/282

FOREIGN PATENT DOCUMENTS 929053  6/1973  Canada .
2085919  12/1971  France .
2614396  10/1976  Germany .

Primary Examiner—Khanh Dang
Attorney, Agent, or Firm—Baker & Maxham

[57] ABSTRACT

A heat shield apparatus, particularly for motor vehicle exhaust systems, which is coupled to and closely spaced from the heat source. The particular structure of the invention enables the mounting to be connected directly to the heat source while being behind the heat shield itself from the viewpoint of the heat source. The mounting is connected to the heat shield at positions where the temperature of the heat shield is substantially below its highest value.

20 Claims, 2 Drawing Sheets

HEAT SHIELD WITH FASTENING FOR EXHAUST SYSTEMS

BACKGROUND OF THE INVENTION

1. Field of the Invention

This invention concerns a heat shield for heat exhaust sources, such as exhaust systems, and more particularly provides a retaining hanger mounted to the heat source which places the heat shield only a small distance from the heat source.

2. Description of the Related Art

Heat shields of the type in question are used for shielding the body of motor vehicles, where the heat emitting parts may include an exhaust pipe, a muffler, a catalytic converter or other parts of the exhaust system or the engine. The invention is thus based on a heat shield of the type defined initially that is to shield a part that emits heat to protect neighboring parts from the radiant heat.

It is known that such heat shields are made of a multilayer aluminum material, which has the advantage that this aluminum material can be shaped very easily and has a high reflectivity, so a highly effective heat shield can be created with relatively little material. In the past, however, it was known only that such a heat shield could be mounted on parts of the automobile body itself, although that greatly restricted the use range.

There are several drawbacks to this known type of mounting of a heat shield on the automobile body or parts directly connected thereto, among them being;

1. The heat shield must be relatively large because it is relatively far away from the heat emitting part, and therefore the entire body surface must be shielded with respect to the heat emitting part, which thus leads to the necessity of using a heat shield with a relatively large area. Therefore, the heat shield must also be mounted a relatively great distance away from the heat-emitting exhaust because the latter is subject to certain vibrations, and the vibrating exhaust must not come in contact with the heat shield opposite it at the maximum amplitude of its vibration. For this reason, it is necessary to shield relatively large areas of the automotive body or even the tank surfaces of the gasoline tank.

2. Another disadvantage of mounting the heat shield on automotive body parts or on parts that are directly mounted on the body is that additional mounting parts on the body are needed, but such are not always available. For example, if the radiant heat from an exhaust pipe passing directly by the gasoline tank is to be shielded, it is practically impossible to mount the heat shield on the gasoline tank itself because the heat shield is heated to temperatures of 200° C. or 250° C. and the mounting parts on the gasoline tank, or the tank itself which may be made of plastic, can withstand temperatures only up to 80° C. Consequently, it has been impossible in the past to directly mount heat shields made of aluminum directly on exhaust parts or other parts that emit a great deal of heat, because the melting point of aluminum is in the range of about 600° C. and is thus higher than the melting point of the plastic parts. With direct mounting, too much heat can also be transferred and thus the temperature inside the vehicle may rise too high, so parts of the interior, such as the carpet or other objects, can be damaged.

SUMMARY OF THE INVENTION

A major purpose of this invention is therefore to improve on a heat shield and a mounting of the heat shield of the type mentioned initially such that they can be mounted directly on heat emitting parts.

It is an important feature of this invention that the heat shield is mounted a relatively short distance from the heat emitting part, such as the exhaust pipe, the muffler, the exhaust manifold or similar parts, and a retaining hanger is mounted behind the heat shield as seen from the heat emitting part, and this retaining hanger is directly connected to the heat emitting part by way of a connecting element.

Another embodiment provides for the retaining hanger to secure and mount the heat shield at a point on the heat shield where the temperature of the heat shield, and/or the U-shaped retaining hanger, has already dropped relatively greatly.

In a practical embodiment of the present invention, a generally U-shaped retaining hanger is connected directly to the heat emitting part by means of a stud bolt which is used as a mounting element on the exhaust pipe, the muffler or the exhaust manifold of the engine.

According to this invention, the retaining hanger is connected to the heat shield with its lower U-shaped legs in the area of the free ends of these legs. As a result, heat transmitted from the heat emitting part to the retaining hanger must first pass through the entire length of the retaining hanger. Since the retaining hanger is located in a relatively cool area behind the heat shield, there is a definite cooling of the retaining hanger, so that only the temperature of the heat shield heated by the radiant heat prevails at the connecting points between the retaining hanger and the heat shield. This prevents damage to the heat shield by the hotter retaining hanger.

This type of mounting eliminates a widespread prejudice in the technical world, because according to the technical teaching of the present invention, the heat shield is mounted in the immediate proximity of or a slight distance away from the heat emitting part, but the high-temperature-proof retaining hanger passes outside this part, that is, radially outward from the heat source on the outside of the heat shield, and it is also protected by the heat shield from radiant heat.

This structure yields some important advantages that were not previously obtained with the prior art. Due to the fact that the heat emitting part is shielded with an aluminum heat shield mounted at a relatively short distance, this yields the advantage that no other built-in parts that could interfere with the thermal reflection are present in the interspace between the heat emitting part and the heat shield.

The heat shield is now capable of optimally reflecting the heat striking the heat shield back onto the exhaust pipe or another heat emitting part without heating the heat shield essentially to the deformation temperature range. Studies have shown that when the exhaust pipe is at approximately 1000° C. (red hot), the heat shield surrounding the exhaust pipe heats up only to a temperature of about 300° C., where it is important for the heat shield not to come in contact with the high-temperature heat source at any point where it could conduct heat. The heat shield is thus insulated from the heat emitting part on all sides and does not come directly in contact with the heat source anywhere that could conduct heat. This yields the advantage that the retaining hanger itself is in heat-conducting contact with the heat source because it is connected directly to the heat source by the mounting element but the connection between the retaining hanger and the heat shield is established at the point where the retaining hanger also has cooled to a temperature at which no deformation or even melting of the heat shield need be feared.

It is preferable here if in a first embodiment the legs of the U-shaped retaining hanger are bent outwardly approximately horizontally and the heat shield is also bent horizontally in this area to connect the two parts by rivets or other connecting elements.

In another embodiment, instead of the horizontally bent legs, the heat shield is continued vertically downwardly and is also provided with appropriate vertical projections to create a vertical connecting area between the two parts.

In both cases it is important for the connecting point between the heat shield and the retaining hanger to be located in an area where the retaining hanger has already cooled to a tolerable temperature. This connecting point should be as far as possible away from the connecting point between the retaining hanger and the mounting element on the heat source.

Of course it is also possible to create several connections between the heat shield and the retaining hanger.

This technical teaching yields the important advantage that the heat shield need have only a relatively small surface area because it is a close distance away on the muffler itself or the exhaust pipe, and then it is no longer necessary to cover surfaces of the body that are a relatively great distance apart with the heat shield. Thus, the heat shield is as close as possible but is located at a radial distance from the heat source, and any direct thermal conduction between the heat shield and the heat source must be suppressed.

This also yields the advantage that it facilitates assembly, because it is now possible for the first time to provide an exhaust system with a heat shield immediately on installation of the exhaust system into a motor vehicle and to install it completely, and separate mounting points on the automotive body are no longer needed.

Thus it is now possible for the first time to also create a heat shield between an exhaust pipe and sensitive body parts, such as a gasoline tank made of plastic, without the need of having to mount it on the gasoline tank.

It has been possible in the past to mount heat shields directly on the exhaust, but these heat shields had to be made of high-strength steel or chrome steel, which has the disadvantage of high manufacturing costs and poor heat reflection properties plus a greater weight. The chrome steel had to be protected from deformation because it was in direct heat-conducting contact with the heat source and therefore it had to be designed with relatively thick dimensions, which was associated with a high manufacturing cost.

Furthermore, another disadvantage was that this chrome steel would oxidize at high temperatures, which would thus impair the heat reflecting properties and would be associated with a corresponding decline in efficiency of the heat shield. Therefore, such heat shields could not be used with sensitive body surfaces.

The present invention makes it possible for the first time to provide aluminum heat shields whose unit conductance has a value of 0.3, for example, while corresponding plates of chrome steel have a unit conductance of 4.5 or more.

This invention is not limited to mounting the retaining hanger on the heat source by means of stud bolts. All types of mounting can be provided between the heat source and the retaining hanger. Instead of the stud bolts shown here, other types of mounting elements may also be used. For example, the retaining hanger can be mounted directly on the heat source at a fixed distance, for example, by welding, but detachable mounting elements such as springs, insert elements or clamping elements may also be used.

It is always important that the retaining hanger be protected from heat radiation with the heat shield itself so it cools and is connected to the heat shield in a relatively cool temperature range. This cool range must be below the melting point of the heat shield.

BRIEF DESCRIPTION OF THE DRAWING

The objects, advantages and features of this invention will be more readily understood from the following detailed description, when read in conjunction with the accompanying drawing, in which.

DETAILED DESCRIPTION OF THE PREFERRED EMBODIMENTS

Figure 1:
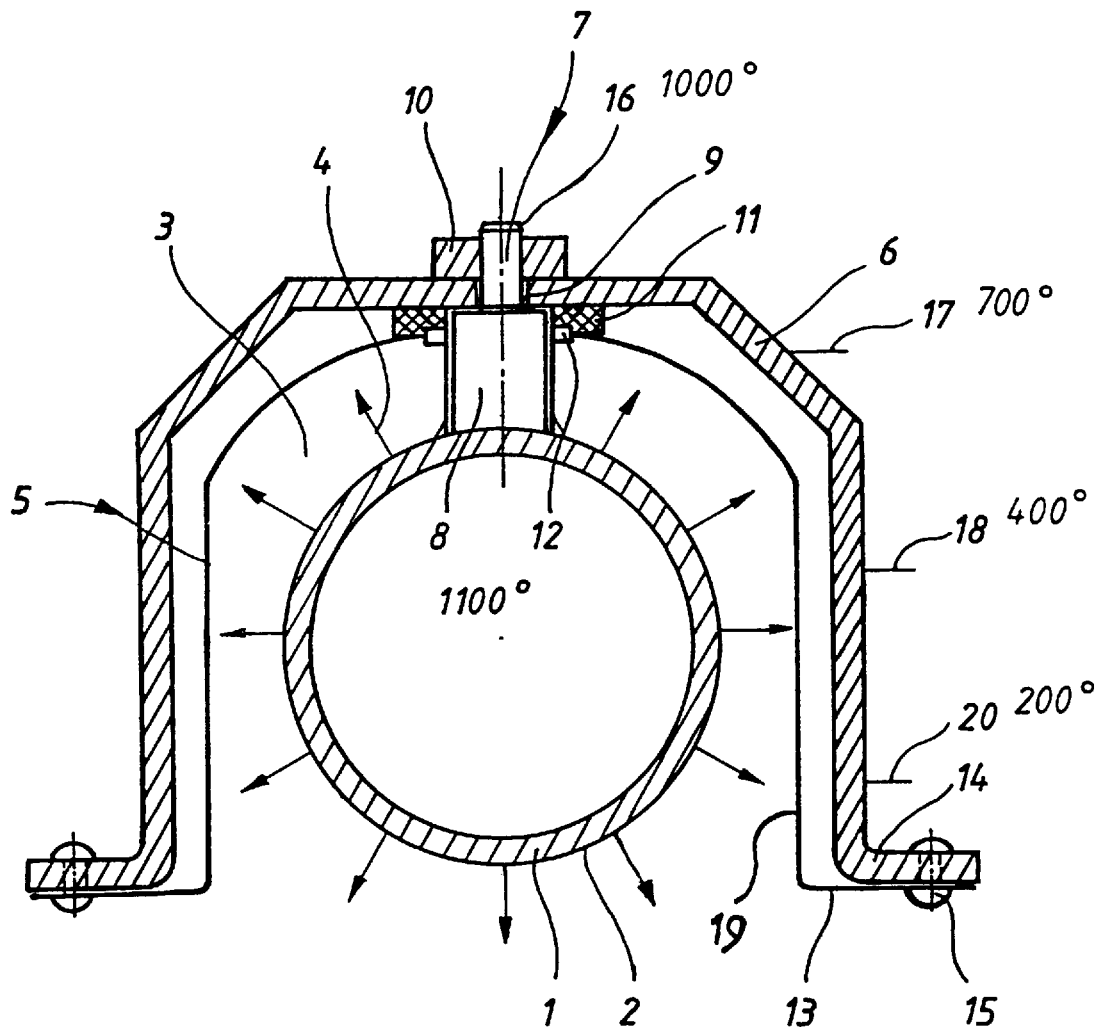
FIG. 1 is a schematic sectional view of one embodiment constructed according to the invention.
Figure 2:
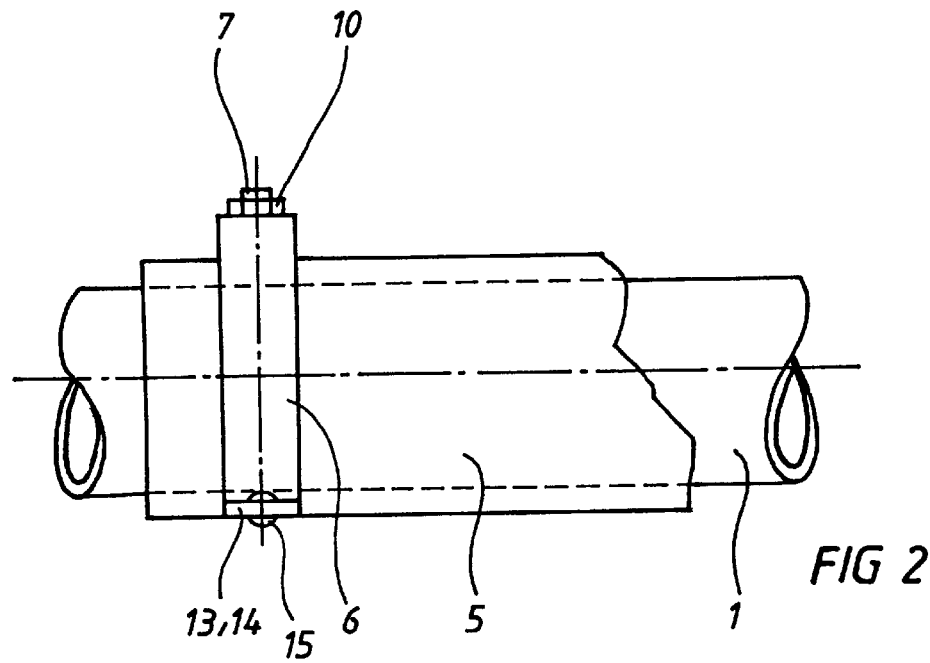
FIG. 2 shows a side view of the arrangement according to FIG. 1.

It was stated above that any desired heat source may be used. The present Figures illustrate the heat source as an exhaust pipe 1 to whose top side stud bolt 7 is welded on the exhaust pipe or otherwise appropriately secured there, for example, with a clamp. Stud bolt 7 consists of stud 8 having a slightly larger diameter with which it is welded onto surface 2 of exhaust pipe 1 and a slightly smaller stud designed as a stud bolt.

This difference in diameter serves as a stop for the retaining hanger. Of course, any other type of connection between the retaining hanger and stud bolts or other suitable retaining devices is also possible.

Exhaust pipe 1 has a surface temperature of up to 1100° C. It is important that heat shield 5 that is made of aluminum and may consist of one or more layers now surrounds muffler 1 radially on the outside as a part shaped approximately like the number 5, where the length of heat shield 5 may be any desired length.

Exhaust pipe 1 emits radiant heat radially in the direction of arrows 4, and this heat is reflected by inside surface 19 of heat shield 5 back to the exhaust pipe.

It is important for heat shield 5 not to come in contact with the heat source itself at any point, in other words, not even in the area of stud bolt 7. For this purpose, the heat shield has orifice 12 with a larger diameter in the area of stud 8, so in this area it is a distance away from the stud 8 of stud bolt 7 to prevent direct conduction of heat. This orifice 12 can be sealed by suitable gasket 11 having a low thermal conductivity. This gasket is preferably made of a high-temperature fiber material.

Retaining, hanger 6 is mounted on stud 8 of stud bolt 7 and has a borehole passing through the threaded part of the stud bolt. Retaining hanger 6 is held on stud 8 by means of nut 10 that is screwed onto the threaded bolt.

In this embodiment, retaining hanger 6 is approximately U-shaped and has approximately horizontal projections 14 that extend outward on the free outer ends of the legs of the U-shaped retaining hanger and are matched with projections 13 on heat shield 5. In the area of these two projections 13, 14, mounting elements such as rivets 15 are provided to mount the heat shield to the retaining hanger. It is self-evident that several of these retaining hangers 6 may be arranged so they are spaced a distance apart over the length of exhaust pipe 1.

Interspace 3 between exhaust pipe 1 and heat shield 5 serves as the insulation interspace so that temperatures that are safely below the deformation temperature of the heat shield occur on inside surface 19 of the heat shield.

It is important that the thermal conduction from stud bolt 7 to the retaining hanger is in the upper range, so that temperatures in the range of approximately 1000° C. are reached in position 16, directly at stud bolt 7. At a distance from this, retaining hanger 6 cools down significantly due to thermal radiation, so a maximum temperature of about 700° C. is reached at position 17. It is protected completely from the effect of heat from exhaust pipe 1 by heat shield 5 along its entire length, so it cools accordingly at a distance from stud bolt 7. At position 18, the retaining hanger reaches a temperature of about 400° C., for example, whereas at position 20, a temperature of only about 200° C. is reached. The mounting of the retaining hanger and the heat shield is located in this area.

Figure 3:
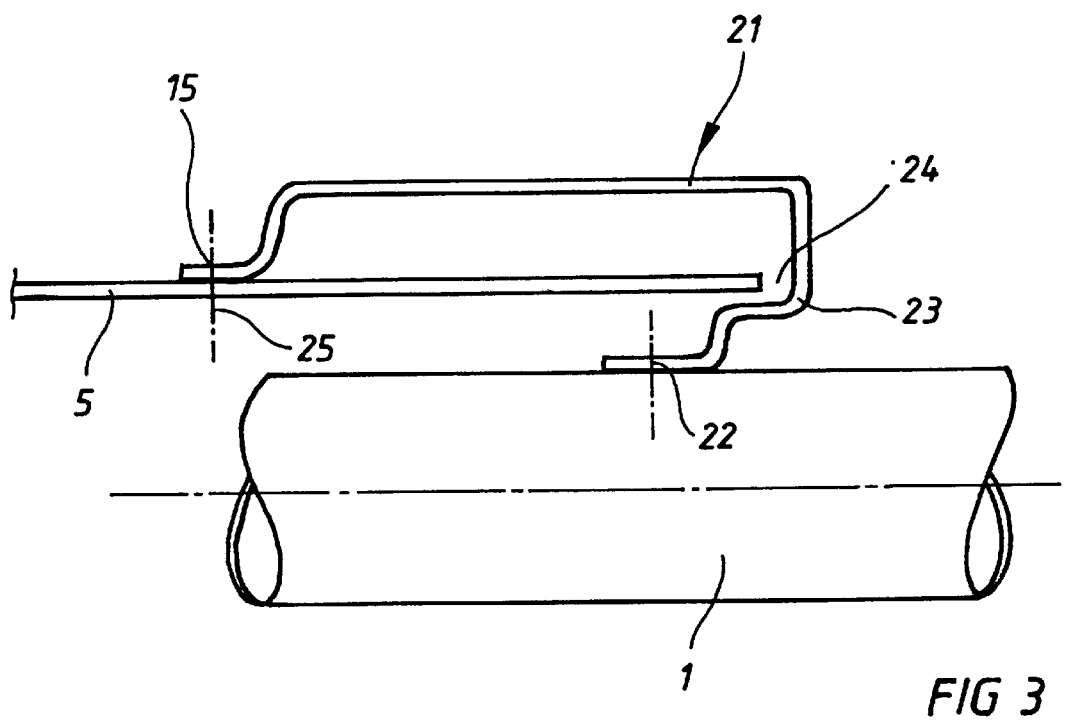
FIG. 3 shows an alternative embodiment for mounting the heat shield of the invention.

In another embodiment of this invention according to FIG. 3, another design of the retaining hanger is shown. Retaining hanger 21 is not designed as a U-shaped part, but instead is approximately C-shaped in the side view, and is attached with a first leg of the C to mounting 22 directly on muffler 1. Retaining hanger 21 then forms cropped bend 23 in which heat shield 5 engages, and it is important here for some clearance 24 to remain between the heat shield and the retaining hanger on all sides to avoid direct thermal conduction in the high-temperature area.

In this embodiment, retaining hanger 21 cools over its entire length, starting at mounting point 22, so a corresponding type of mount with rivet 15 or some other mounting element on heat shield 5 can be performed at mounting point 25.

It can be seen from these two embodiment examples that the shape of the retaining hanger does not play a role but the arrangement of the retaining hanger with respect to the heat shield is important. According to this invention, the heat shield is arranged directly in the ambient area of the heat source and the retaining hanger is mounted on the heat source in direct heat-conducting contact, but the retaining hanger is mounted outside the heat shield (at a radial distance therefrom), and is connected to the heat shield in the area where no deformation or melting of the heat shield need be expected.

Thus, the temperature gradient on the retaining hanger is used to define the mounting location. The retaining hanger is protected from the influence of heat by the heat shield itself and it can therefore cool below the melting point of the aluminum material.

Of course the present invention is not limited to the choice of aluminum for the material of the heat shield, but other materials may also be used. In particular, aluminum sandwich designs may be considered, but plastic designs are also possible.

Another advantage of the present invention is that the sound absorbing properties of the heat shield can now be utilized much better because the heat shield can be mounted at a short distance from but close to the sound source and thus an optimum sound absorbing effect is achieved.

On the whole this yields a uniform shielding effect that can be achieved at a much lower cost than in the past.

It is likely that modifications and improvements will occur to those skilled in the art which are within the spirit and scope of the accompanying claims.

What is claimed is:

1. Apparatus for shielding protected elements from radiant heat emitted from heat emitting elements, said apparatus comprising:

retaining hanger means for mounting to the heat emitting elements; and a heat shield secured by said retaining hanger means in a spaced, adjacent relationship with respect to the heat emitting elements and positioned between the heat emitting elements and the protected elements, with a substantial portion of said retaining hanger being behind said heat shield with respect to the heat emitting elements when mounted to the heat emitting elements.

2. The apparatus according to claim 1, and further comprising a connecting element between said retaining hanger and the heat emitting elements.

3. The apparatus according to claim 1 or 2, wherein said connecting element between said heat shield and said retaining hanger is located at a relatively cooler location on the said retaining hanger.

4. The apparatus according to claim 1 or 2, wherein said retaining hanger is approximately U-shaped and is connected to said heat shield at the distal ends of said U-shaped retaining hanger.

5. The apparatus according to claim 4, wherein said connecting element passes through an orifice in said heat shield and connects to said retaining hanger on the side of said heat shield facing away from the heat emitting elements.

6. The apparatus according to claim 1 or 2, wherein said retaining hanger is approximately C-shaped.

7. The apparatus according to claims 1 or 2, wherein the connection between said heat shield and said retaining hanger is established by rivets.

8. The apparatus according to claim 1 or 2, wherein said heat shield is an aluminum part with at least one layer of aluminum.

9. A heat shield for a vehicle exhaust system, comprising:

a retaining hanger with a base and at least one elongated curved arm extending outward from the base, with the base adapted to be mounted to a heat emitting element; and a heat shield mounted to the end of the curved arm, and positioned to be between the retaining hanger and the heat emitting element so that a substantial portion of the retaining hanger is behind the heat shield with respect to the heat emitting element, when mounted thereto.

10. The heat shield according to claim 9, further comprising a second elongated curved arm extending outward from the base, with the heat shield coupled to the end of both the first and the second curved arm, positioned between the retaining hanger and the heat source so that a majority of the retaining hanger is behind the heat shield with respect to the heat emitting element.

11. The heat shield according to claim 9, further comprising a borehole located through the base of the retaining hanger, through which a connecting element mounts the retaining hanger to the heat emitting element.

12. The heat shield according to claim 9, further comprising a gasket having a low thermal conductivity, mounted between the retaining hanger and the heat shield, and surrounding a borehole located in the base of the retaining hanger.

13. The heat shield according to claim 9, wherein the retaining hanger and heat shield are U-shaped.

14. The heat shield according to claim 9, wherein the retaining hanger is C-shaped.

15. The heat shield according to claim 9, wherein the heat shield is composed of at least one layer selected from the group consisting of aluminum and plastic.

16. A heat shield for a vehicle exhaust system, comprising:
- an outer U-shaped member, having a base with a borehole and two distal ends, wherein the base is attached to a heat emitting element by mounting a connecting element through the borehole; and
- an inner U-shaped member, having a base with an orifice and two distal ends, where the distal ends of the inner and outer U-shaped members are attached together, and the orifice of the inner member surrounds the connecting element such that a majority of the outer U-shaped member is behind the inner U-shaped member with respect to the heat emitting element, when mounted thereto.

17. The heat shield according to claim 16, further comprising a gasket having a low thermal conductivity, mounted between the inner and outer members, and surrounding the borehole.

18. The heat shield according to claim 16, wherein the connecting element is a stud.

19. The heat shield according to claim 16, wherein the inner U-shaped member is composed of at least one layer selected from the group consisting of aluminum and plastic.

20. The heat shield according to claim 16, wherein the distal ends of the inner and outer U-shaped members are bent outwardly.

* * * * *